(12) United States Patent
Kim

(10) Patent No.: US 8,419,909 B2
(45) Date of Patent: *Apr. 16, 2013

(54) APPARATUS FOR FRESHLY STORING FOODSTUFF AND METHOD THEREOF

(76) Inventor: Chil-Young Kim, Gyeonggi-do (KR)

( * ) Notice: Subject to any disclaimer, the term of this patent is extended or adjusted under 35 U.S.C. 154(b) by 1086 days.

This patent is subject to a terminal disclaimer.

(21) Appl. No.: 11/988,332

(22) PCT Filed: Jul. 14, 2006

(86) PCT No.: PCT/KR2006/002769
§ 371 (c)(1),
(2), (4) Date: Jan. 4, 2008

(87) PCT Pub. No.: WO2007/011133
PCT Pub. Date: Jan. 25, 2007

(65) Prior Publication Data
US 2010/0028508 A1 Feb. 4, 2010

(30) Foreign Application Priority Data
Jul. 15, 2005 (KR) .................. 10-2005-0064475

(51) Int. Cl.
C25B 11/02 (2006.01)
C25B 1/24 (2006.01)
C02F 1/467 (2006.01)
C02F 1/461 (2006.01)

(52) U.S. Cl.
USPC ......... 204/271; 204/278.5; 204/289; 205/742

(58) Field of Classification Search .............. 99/451, 99/467; 426/310; 204/230.8, 289, 280; 205/628–637
See application file for complete search history.

(56) References Cited

U.S. PATENT DOCUMENTS
4,014,766 A * 3/1977 Watanabe et al. ............ 205/746

FOREIGN PATENT DOCUMENTS
| JP | 07163325 A | * | 6/1995 |
| KR | 20-2000-0012830 | | 7/2000 |
| KR | 2000-0012830 | * | 7/2000 |
| KR | 10-0465858 | | 12/2004 |

OTHER PUBLICATIONS

"Electrolytic production of Hydrogen gas" by Albert H. Steinbrecher, Oil & Soap, Feb. 1939, p. 36-39.*
Form PCT/ISA/210 (Int'l Search Report), WIPO, taken from corresponding Int'l App. No. PCT/KR2006/002769, dated Oct. 20, 2006, 2 pages.

* cited by examiner

Primary Examiner — Henry Yuen
Assistant Examiner — Jianying Atkisson
(74) Attorney, Agent, or Firm — Kusner & Jaffe

(57) ABSTRACT

The present invention provides an apparatus and a method for storing foodstuff comprising: a container for accommodating water and the foodstuff; at least one electrode unit having a negative electrode within the container and a positive electrode therewithin facing the negative electrode; and a power supplier for supplying electric power to the electrode unit, thereby inducing electrolysis between the negative electrode and the positive electrode set apart from each other so as to generate oxidants, and removing bacilli of decaying foodstuff by the oxidants, and thus, maintaining the freshness of foodstuff for a long time without freezing or refrigeration.

14 Claims, 9 Drawing Sheets

APPARATUS FOR FRESHLY STORING FOODSTUFF AND METHOD THEREOF

TECHNICAL FIELD

The present invention relates to an apparatus for storing foodstuff and a method thereof, more particularly, to an apparatus and a method of maintaining the freshness of foodstuff such as meat, fish and shellfish for a long time without freezing the foodstuff.

BACKGROUND ART

As many people are getting interested in a well-being life these days, the concern for one's health is also getting higher. However, as foodstuff such as meat, fish and shellfish which is likely to dacay in normal temperature, the foodstuff has been stored in frozen condition or been hurriedly transported within a short time after butchery.

However, when meat such as beaf, mutton having a larger portion of red muscular fibers is frozen, calcium ions are eluted from mitochondria of the red muscular fibers in the low temperature or low oxygen condition, and thus, the calcium coherence of sarcoplasmic reticulum therein becomes lower, and the calcium concentration near the myofibril becomes higher, and then, a cold shortening occurs to prompt the shrinkage of muscles, to break the nutrition thereof and to make the meat more tough.

More concretely, as time goes on after cattle, sheep or pigs are killed, glycogen of creatine phosphate in the muscle thereof begins to be consumed, the level of ATP is lowered into below some value, and irreversible actomyosin bridge between muscular fibers begins to be formed, thereby lowering the softness and extensibility. Accordingly, when creatine phosphate and glycogen is completely exhausted and when the pH value of the muscle reaches a maximum, the irreversible mutual combination between actin and myosin is prompted, and then, the muscle rigidity phenomenon of making the muscle tougher happens. That is, as meat undergoing the process of the muscle rigidity has reduced lengths of sarcomere, the lowered softness thereof and the lowered humidity therein, the meat should undergo an aging process.

Also, when temperature around the meat is sharply lowered after butchery or is highly maintained after butchery, the quality of the meat is badly influenced, thereby causing a problem that the meat requires longer ripening time.

FIG. 1 shows a shortening (i.e., shrinkage) degree of muscular fiber after butchery when meat is maintained at respective temperatures at which meat does not reach to the state of a muscle rigidity. That is, as shown in FIG. 1, the shortening degree of the muscular fiber becomes lowest near 18° C., and the shortening degree of the muscular fiber is fine in the range between 10° C. and 25° C. Thus, when the temperature becomes out of the range therebetween, as the shortening degree becomes higher, the meat becomes tough for people to eat. Especially, the shortening degree reaches high value of 50% when the temperature reaches 0° C. In this regard, the phenomenon is referred to as cold shortening that the pre-rigor muscle sharply becomes cold in the range between 0° C. and 16° C. This phenomenon is easily found in meat or mutton having higher portion of red muscle fiber. That is, in low temperature and oxygenless condition, as calcium ions are eluted from mitochondria, and as calcium coherence of sarcoplasmic reticulum therein becomes lower, the calcium concentration near the myofibril becomes higher thereby prompting the shortening of a muscle.

To the contrary, the shortening degree of muscular fiber is higher in high temperature condition above 18° C., which is referred to as heat shortening. The heat shortening is generated by that, enzymes related with ATPase and metabolic operation in muscles become activated by heat supply, and therefore, that ATP, CP, glycogen are resolved with higher speed, thereby prompting the rigidity after butchery.

Also, the muscle rigidity phenomenon is found in fish and shellfish as well as meat. That is, in order to store foodstuff such as meat, fish, shellfish, vegetables, fruits, if the foodstuff keeps freezed or refrigerated below 10° C., it is impossible to maintain the its freshness and also impossible to maintain its nutrition and flavor. Therefore, it has been highly required to freshly store foodstuff with maintaining its nutrition and flavor.

DISCLOSURE OF INVENTION

Technical Problem

These disadvantages of the prior art are overcome by the present invention. It is an object of the present invention to provide an apparatus and a method for freshly storing foodstuff such as meat, fish, shellfish, vegetables without freezing.

Another object of the present invention is to maintain fresh flavor and inherent nutrition of foodstuff such as meat, mutton for a long time by storing the foodstuff without freezing thereby preventing a muscle shortening.

Yet another object of the present invention is to provide an apparatus for a storing foodstuff sterilizing bacteria and virus within a short time by forming oxidants with more acute electrolysis thereby requiring less electric power consumption.

Therefore, only a relatively low amount of electricity is needed to be supplied for creating the predetermined amount of the oxidants, and thus, the small battery can be applied.

Still another object of the present invention is to provide an apparatus for storing meat, mutton with preventing the muscle shortening thereof and thus can provide delicious meat.

Also, the present invention has an another object of preventing from eating harmful component such as agricultural chemicals by removing the chemicals on the surface of the vegetables or fruits.

Technical Solution

In order to attain the above mentioned object, the present invention provides an apparatus for storing foodstuff comprising: a container for accommodating water and the foodstuff; at least one electrode unit having a negative electrode within the container and a positive electrode therewithin facing the negative electrode; and a power supplier for supplying electric power to the electrode unit.

That is, by putting the foodstuff such as meat, mutton, vegetables and fruits into the container and then by electrolyzing the water through supplying electric power to the electrode unit so as to generate the oxidants, as the newly generated oxidants fundamentally sterilize the water by removing or killing the bacilli therein which make the foodstuff decay, the apparatus can realize fresh storing of the foodstuff in the container for a long time without freezing or refrigeration.

Simultaneously, when vegetables and/or fruits are stored in the container, the newly generated oxidants effectively remove the agricultural chemicals on the surface of vegetables and fruits thereby also fundamentally preventing a human from eating the harmful agricultural chemicals thereon.

Herein, a plurality of negative electrode projections are protrudedly formed on the negative electrode, and a plurality of positive electrode projections are protrudedly formed on the positive electrode. Therefore, when an electric power is supplied to the negative electrode and the positive electrode, as the more electric charges are concentrated on the projections, acute electrolysis can be realized between the positive electrode projections and the negative electrode projections, thereby reducing the electric power consumption, promptly sterilizing the water, and storing the foodstuff freshly without freezing or refrigeration.

More concretely, an electric power is supplied to the negative and positive electrode projections, water therebetween is electrolyzed. Herein, new oxidants such as $O_3, H_2O_2$, OH radicals, HOCl becomes generated to sterilize microbes, bacilli, bacteria, viruses, germs, microorganisms, fungi and so on. Hereinafter, the positive electrode and the negative electrode is to be referred to as "electrode unit". The oxidant formation and sterilizing process by electrolysis are attained by following (1) to (5) procedures.

(1) The process of ozone creation starts from electrolysis of $H_2O$ and finished with a combination of O and $O_2$.

$$H_2O \rightarrow H^+ + (OH)_{ads} + e^-$$

$$(OH)_{ads} \rightarrow (O)_{ads} + H^+ + e^-$$

$$2(OH)_{ads} \rightarrow O_2 + 2H^+ + 2e^-$$

$$*2(O)_{ads} \rightarrow O_2$$

$$(O)_{ads} + O_2 \rightarrow O_3$$

(2) $H_2O_2$ is made by a direct process of electrolysis of $O_2$ and indirect process of a combination of OH radicals, a medium generated by $O_3$. That is, direct course, $$O_2 + e^- \rightarrow O_2^-$$

$$O_2 + 2H^+ + 2e^- \rightarrow H_2O_2$$

Indirect course, $$OH \cdot + OH \cdot \rightarrow H_2O_2$$

(3) HOCl is formed by chemical reaction with $H_2O$ after combining with $Cl^-$ existing in water with $Cl_2$.

$$2Cl^- \rightarrow Cl_2 + 2e^-$$

$$2H_2O + 2e^- \rightarrow H_2 + 2OH^-$$

$$Cl_2 + H_2O \rightarrow HOCl + H^+ + Cl^-$$

(4) OH radicals are created and vanished too soon to measure it directly, but in the case of ozone existing in water, OH radicals are finally created forming radical chain cycle with reacting with $HO2^-$, conjugate base of $H_2O_2$, or $OH^-$.

$$O_3 + OH^- \rightarrow \text{Radical Chain Reaction} \rightarrow OH \cdot$$

$$O_3 + HO^{2-} \text{(conjugate base of } H_2O_2 \rightarrow \text{Radical Chain Reaction)} \rightarrow OH \cdot$$

(5) Microorganisms existing in water get removed or inactivated by the oxidants, the following microorganism is removed by electroadsorption and the following microorganics gets removed by direct electrolysis reacting with $e^-$.

That is, regarding the microorganism, $$M(\text{Microorganism}) \rightarrow \text{Electrosorption} \rightarrow \text{Inactivation}$$

Also, $$M(\text{Microorganism}) + O_3 \rightarrow \text{Inactivation}$$

$$M + OH \cdot \rightarrow \text{Inactivation}$$

$$M + HOCl \rightarrow \text{Inactivation}$$

And, regarding microorganics, $$M(\text{Microorganics}) + e^- \rightarrow M-$$

Also, $$M(\text{Microorganics}) + O_3 \rightarrow \text{Product}$$

$$M + OH \cdot \rightarrow \text{Product}$$

$$M + HOCl \rightarrow \text{Product}$$

That is, during electrolysis, oxidation or sterilization is performed by the various oxidants ($O_3$, $H_2O_2$, HOCl, OH radical) formed in the (1) to (5) procedures and, after the electrolysis, the sterilizing process can last due to the high residency characteristics of HOCl, thereby preventing the foodstuff from being decayed.

Herein, the negative electrode and the positive electrode form a plate shape, on which projections shaped like a pillar or having its sharp end are formed respectively to face each other, so that more electric charges can be concentrated on the end of the projections, and thus, electrolysis can be more prompted. Also, in order to induct more electrolysis in the unit area, it is preferable that the negative electrode and the positive electrode form plural pairs of plates or rods.

On the other hand, a branch plate ramified from the surface of the plate-shaped negative electrode and the plate-shaped positive electrode projects, and a branch plate ramified from the negative electrode and a branch plate from the positive electrode are arranged facing each other one by one, and the negative projections and the positive projections are respectively formed in the facing branch plates whereby electrolysis area can be maximized in the minimum space. Furthermore, additional branch plate can be formed from the branch plate, and negative projections and positive projections is formed in the facing side of the other branch plates extended from a negative electrode and a positive electrode.

Herein, in order to induct more vigorous electrolysis near the negative projections and the positive projections, it is desirable that the negative projections and the positive projections are made of platinum or plated with platinum. Here, platinum can cover the whole electrode, but it is more efficient to thickerly plate the area which negative projections and a positive projections than other parts.

Alternatively, grooves instead of the positive projections and the negative projections can attain the identical effect by causing electric charges to converge on the specific areas.

Also, if the negative projections and the positive projections are made of platinum and are formed as proper size, projections can be replaced by screw connection. On the other hand, in order for reduce the manufacturing cost, the negative projections and the positive projections can be plated with titanium or be made of titanium or carbon.

Herein, during storing the foodstuff, it would be possible to continuously supplying electric power to the electrode unit, as described above, as the oxidants such as HOCl last in the water for a time being due to the high residency characteristics thereof, it is desirable to periodically supply the electric power to the electrode unit.

Also, in order to prevent the temperature around the foodstuff in the container from being changed according to the surroundings of the apparatus, the apparatus further comprises at least one temperature sensor for measuring the water; cooling circulation conduits and heat lines for cooling or heating the water in the container when the temperature sensed by the temperature sensor is out of the preset temperature range (e.g., between 10° C. and 25° C.). Herein, the cold refrigerant used in a refrigeration cycle can be applied to the cooling circulation conduits. Therefore, the temperature of the foodstuff in the apparatus can be freshly maintained within the appropriate temperature range according to the parts of to-be-stored meat or mutton thereby preserving its bestquality in addition to preventing its nutrition from being broken.

The electrode unit is installed in the electrode chamber which is divided by a partition from the foodstuff in the container, and several holes are formed on the partition so that the water in the container can flow into the electrode chamber. Accordingly, as the water can be sterilized by the electrode unit which is separately located in the electrode unit, the breakage possibility of the electrode unit due to users careless usage can be prevented.

Also, the holes are covered by a net or a membrane which allows water to pass therethrough but does not allow particles of the foodstuff to pass therethrough, thereby preventing the electrode unit from being contaminated.

And, the apparatus additionally comprises at least one circulation fan in the container and/or on the partition and/or electrode chamber for spreading the sterilized water near the electrode unit into near of the foodstuff. The circulation fan has functions of maintaining the inside of the container as an aseptic condition as well as promptly circulating the sterilized water near the electrode unit. Here, it is more desirable for the circulation fan to rotate only when electric power is supplied to the electrode unit.

For users convenience, although DC power converted from AC power can be applied to the electrode unit, it is desirable to apply a battery which can be easily purchased in the market. Also, rechargeable battery is also applicable.

In order to discharge the heat of an electrode unit, at least one fin for discharging the heat is formed near the electrode unit, and a blowing fan to blow out the heat transmitted to the fin can further be comprised.

At least one transparent window is formed on the container so that users can easily see through the inside of the container from the outside.

Also, the present invention comprises at least one electrode fixture to fix the each electrode. And the electrode fixture is formed as a slot via which electric current can be supplied. That is, the negative electrode plate and the positive electrode plate can be easily fixed to the slot just by inserting the plate into the slots whereby the electrode unit can be easily installed inside of the lens receiver and the electrode unit can be easily replaced.

On the other hand, the electric power supplier can reverse the direction of the electric current to be supplied to the electrode unit. That is, anode power is firstly sent to the electrode unit working as a positive electrode, and then, after a specific period, the cathode power is changed to sent to the second electrode unit working as a negative electrode, whereby it can prevent residues from adhering to the each electrode during electrolysis. The specific period can be set 1 to 10 times or 2 to 5 days in advance or by the user's needs.

Any one of tap water, underground water, distilled water or purified water can be applied to the apparatus. Further, in order to induce the acute electrolysis, saline solution having concentration about 0.5% to 5% can be applied by mixing the water with an appropriate amount of salt. In case of using saline solution, although it is possible to use normal saline purchased in a market, it is more effective to manufacture saline solution by mixing water with high concentrated saline solution.

On the other hand, the present invention provides salt package used in the apparatus for storing foodstuff, thereby easily manufacture the intended concentrated saline solution.

The present invention also provides An apparatus for storing foodstuff comprising: a container for accommodating water and the foodstuff; at least one electrode unit having a negative electrode within the container and a positive electrode therewithin facing the negative electrode; a power supplier for supplying electric power to the electrode unit; a water supplier for supplying water to the electrode unit; and a spreader for spreading the water sterilized by the electrode unit into the foodstuff.

Also, the present invention provides a method of storing foodstuff comprising: a sterilized water supplying step of manufacturing sterilized water and supplying the sterilized water to the foodstuff.

In this regard, it is desirable for the sterilized water to be manufactured by supplying electric power to at least one electrode unit having a negative electrode within the container and a positive electrode therewithin facing the negative electrode.

The sterilized water supplying step includes a step of periodically spreading the sterilized water to the foodstuff thereby reducing the cost of storing the foodstuff.

As the foodstuff is contained in the container having the electrode with water, by supplying electric power to the electrode unit, the water becomes sterilized. Herein, the method of storing foodstuff according to the present invention further comprises a step of measuring the temperature of the sterilized water, and a step of cooling or heating the water when the temperature thereof is out of the preset temperature range, whereby the foodstuff can be stored in temperature condition the foodstuff requires. During supplying electric power in the electrode unit, a step of circulating water near the electrode unit to near the foodstuff is additionally comprised.

Also, the present invention provides a method of storing foodstuff comprising a step of putting water and foodstuff into the container; a step of sterilizing water by supplying the electrode unit; a step of circulating water near the electrode unit to near the foodstuff; and a step of controlling the temperature of water within the preset temperature range by heating or cooling.

Herein, in case of storing meat and/or mutton, the preset temperature range is set between 10° C. and 25° C., or more preferably about 18° C.

ADVANTAGEOUS EFFECTS

As explained above, the present invention provides an apparatus and a method for storing foodstuff comprising: a container for accommodating water and the foodstuff; at least one electrode unit having a negative electrode within the container and a positive electrode therewithin facing the negative electrode; and a power supplier for supplying electric power to the electrode unit.

According to the present invention, without adding antiseptic into the foodstuff, it can be possible to freshly and sterilely store foodstuff in innoxious condition without causing the food stuff to experience the cold shortening and without losing its moisture, whereby the foodstuff can be sanitarily stored with lower cost. Especially, the present invention enables foodstuff such as shrimp easily losing its inherent flavor when frozen or refrigerated to freshly store for a long time in normal temperature.

Also, the present invention provides a method of spreading or spraying or dropping the sterilized anti-decay water into foodstuff thereby effectively storing a large amount of foodstuff for a long time.

Further, the present invention enables respective foodstuff to be stored at its appropriate temperature at which the foodstuff maintains its flavor and nutrition.

Herein, as a plurality of negative electrode projections are formed on the negative electrode, and as a plurality of positive electrode projections are formed on the positive electrode, a large amount of oxidants are generated by an acute electrolysis between the negative electrode projections and the positive electrode projections whereby bacilli, bacteria, fungi letting foodstuff decay are removed within a short time. Also, as the electric charges are gathered on the projections, it is possible to store foodstuff longer with consuming the less electric power.

The apparatus according to the present invention has an efficacy of removing agricultural chemicals from the surface of vegetables and fruits, as the agricultural chemicals on the vegetables and fruit are removed during storing them, user will not have the less opportunity to eat the harmful agricultural chemicals.

BRIEF DESCRIPTION OF THE DRAWINGS

Accordingly, the present invention will be understood best through consideration of, and reference to, the following Figures, viewed in conjunction with the Detailed Description of the Preferred Embodiment referring thereto, in which like reference numbers throughout the various Figures designate like structure and in which.

BEST MODE FOR CARRYING OUT THE INVENTION

In describing the present invention, detailed description of laid-out function or structure is omitted in order, to clarify the gist of the present invention.

Figure 2:
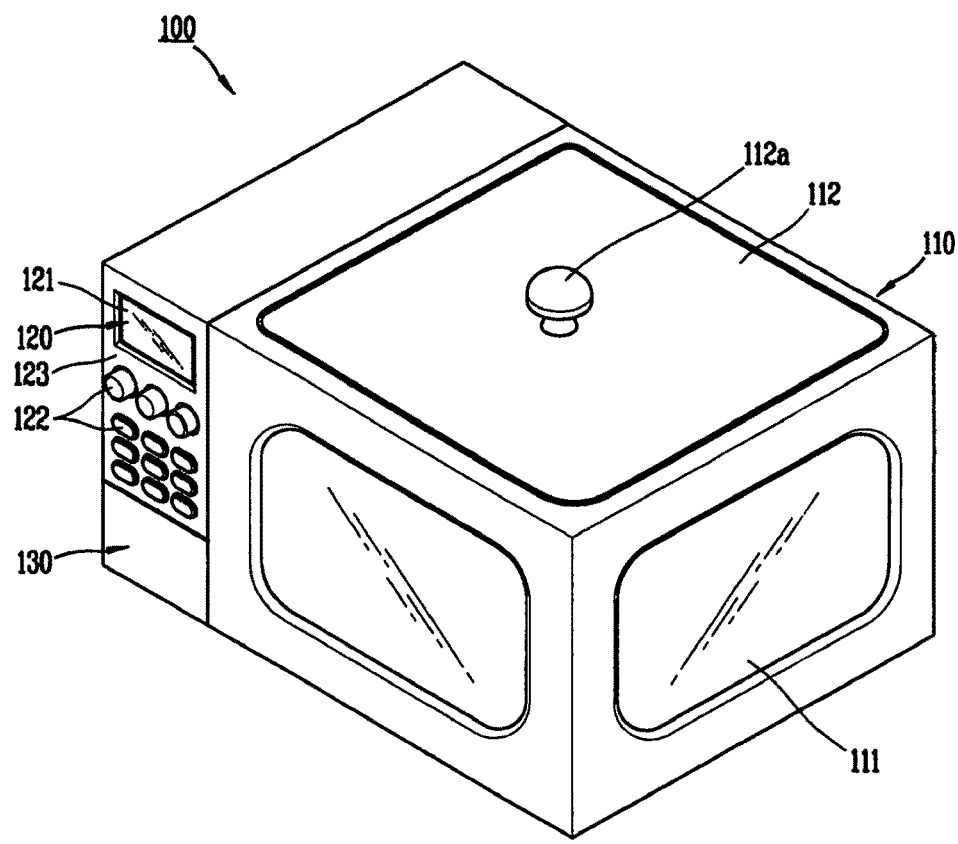
FIG. 2 is a perspective view illustrating an apparatus for storing foodstuff of one embodiment in accordance with the present invention.
Figure 3:
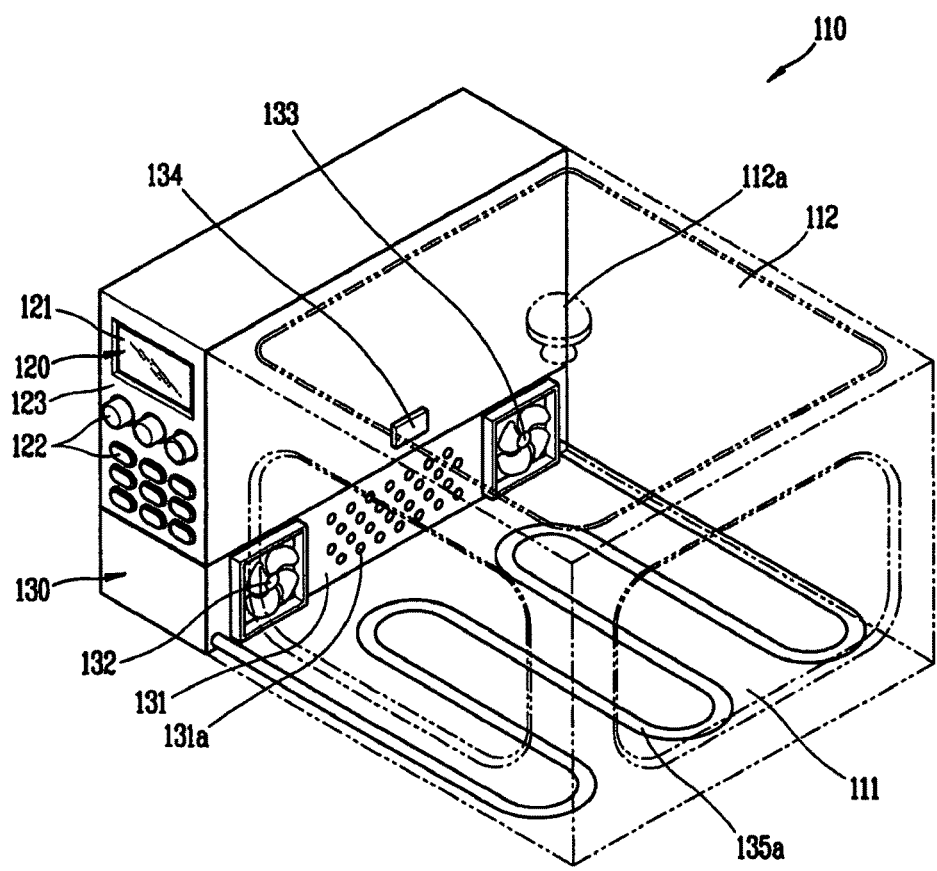
FIG. 3 is a projection view of FIG. 2 excluding the cover thereof.

FIG. 2 is a perspective view illustrating an apparatus for storing foodstuff of one embodiment in accordance with the present invention, FIG. 3 is a projection view of FIG. 2 excluding the cover thereof.

As illustrated in figures, an apparatus 100 for storing foodstuff of one embodiment in accordance with the present invention comprises a container unit 110 for accommodating water and foodstuff, a control unit 120 for controlling to remove bacilli, bacteria letting the foodstuff decay and for providing the optimized surroundings for preserving the foodstuff, electrode chamber 130 connected with the container unit 110 for allowing water pass through therebetween and having a space therein, electrode unit 140 in the electrode chamber 130 for sterilizing and disinfecting the water in the container, power supplier 160 for supplying electric power to the electrode unit 140.

The container unit 110 includes several transparent windows 111 made of transparent plastic or glass so as to see through the inside thereof from the outside, a cover 112 for preventing dusts in the air from entering into the container unit 110 accommodating foodstuff. Herein, so as to effectively isolate the inside of container unit 110 from the outside, rubber ring is attached on the circumference at which the cover 122 gets in contact with the container unit 110.

Although the water can be applied by tap water or underground water, in order to prevent the foodstuff accommodated in the container unit 110 from being contaminated, distilled water or purified water can be used. Herein, water purified from tap water or underground water by using a separate container having a filter can be applied.

The control unit 120 includes a display 121 showing the preserving time or temperature etc. in the container unit 110, operating button 122 for inputting time of supplying electric power to the electrode unit 140 or inputting the period thereof, control circuit 124 for controlling the electrode unit 140 as well as temperature control components such as heat line or refrigerant cycle, controller casing 123 surrounding the control unit 120 at the upper part of the electrode chamber 130.

Herein, water-proof treatment is performed so that water cannot permeate into the control circuit 124.

The numeral 112a in FIG. 2 is a knob of the cover 112.

The electrode chamber 130 includes a partition 131 bordering with a container unit 110 so as to form a interior space therein, a plurality of holes 131a on the partition 131 for allowing water in the container unit 110 to flow into the electrode chamber 130 each other, a blowing circulation fan 132 attached on the partition 131 for promptly discharging water in the container unit into the electrode chamber 130, a suction circulation fan 133 attached on the partition 131 for promptly discharging water in the electrode chamber 130 into the container unit 110, a temperature sensor 134 for measuring the water temperature in the container unit 110, refrigerator 135 for manufacturing cold refrigerant gas when the water temperature is changed to higher than the preset temperature range by the surrounded temperature, cold refrigerant conduit 135a windingly passing through the container unit 110 from the refrigerator 135 so as to make the water therein lower, power cable 136 transferring electric power to the electrode 140 and refrigerator 135, heat line (not shown) for heating water in the container unit 110 when the water temperature is changed to lower than the preset temperature range by the surrounded temperature, a net or a membrane attached on the partition so as to cover the holes 131a which allows only water therethrough except particles of foodstuff.

Figure 1:
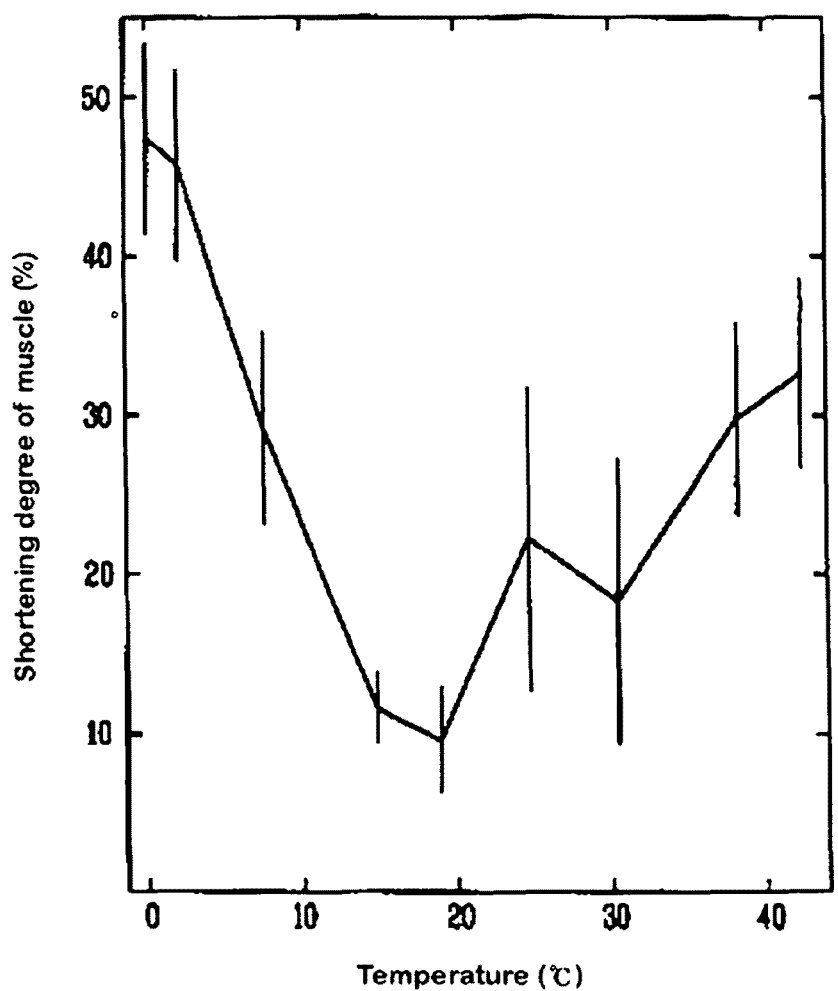
FIG. 1 is a diagram showing the shortening degree of a muscular fiber of meat after butchery according to temperature

Herein, the preset temperature can be differently set according to the type or part of the foodstuff. Specially, in condition of storing meat, referring to FIG. 1, it is effective to maintain the meat temperature between 10° C. and 25° C. Also, the refrigerator 135 includes any kind of device realizing a refrigeration cycle thereby supplying cold refrigerant gas though the conduit 135a as occasion demands.

Further, the power cable 136 is constructed to supply DC power by that AC power is supplied to the apparatus 100, and then, that the AC power is converted into DC power by the control unit 124. However, DC power can be directly supplied via the power cable 136 from any type of rechargeable battery.

The electrode unit 140 is installed in the electrode chamber. The detailed construction thereof will be described hereinafter. Herein, in order to prevent the circuit 123 from being short, the power supply lines 161, 162 are extended to the electrode unit 140 with penetrating the wall of the electrode chamber 130, and are connected with the bottom of the support 143 which electrode plates 141,142 are fixed. Also, In order to prevent water from permeating into the connections between the end of the power supply lines 161,162 and the support 143, a rubber packing plate is closely attached on the bottom surface of the circumference of the support 143, and is fixed on the ground surface of the electrode chamber 130 by fastening screws' 144 passing the holes 143a thereof.

The power supplier 160 converted the supplied AC electric power into DC power so as to supply to the electrode unit 140.

On the other hand, when the platinum plate of the electrode plates 141, 142 is used up, the electrode unit 140 can be easily changed by a step of dissembling the electrode chamber 130, a step of unfastening the fixing screws 144, a step of separating the old support 143 with electrode plates 141, 142, and a step of fixing new support 143 with new electrode plates 141, 142 onto the ground of the electrode chamber 130.

On the other hand, during using the apparatus 100, it is also possible to convert the direction in which electric power is supplied to the electrode unit 140. Thus, the phenomenon can be automatically suppressed that foreign substances are attached on the electrode unit 140 during the electrolysis, whereby the negative electrode plates 131 and the positive electrode plates 132 can keep clean condition without residues attached by electrolysis.

Also, differently recognizing the signal of pushing the operation button 122 according to one time or two times makes differently control the time sending electric power to the electrode unit 124. That is, as the reaction time is different according to usage of water or saline solution, user can control the time by pushing the operation button 122 differently according to user's needs for obtaining an appropriate sterilizing effect. Here, the structure which electric power is supplied to only some parts (not all parts) of electrode unit 140 can realize the similar effect to the foregoing.

Figure 5:
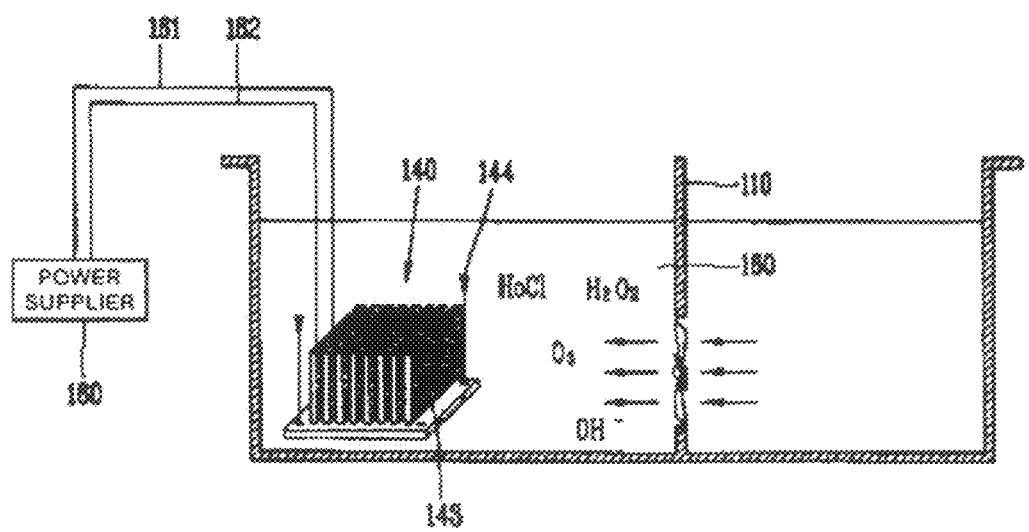
FIG. 5 is a diagram for explaining the operation principle.

In other words, as shown in FIG. 5, the electrode unit 140 of the apparatus 100 for storing foodstuff of one embodiment in accordance with the present invention uses a principle which installs the positive electrode plates 14 and the negative electrode plates 14 apart therefrom about a distance d2 within the water of the container unit 110, and inducts electrolysis in the water by receiving the electric power through the electric power line 161,162 from an electric power supplier 160 and sterilizes bacilli, bacteria and viruses using oxidants like ozone, OH radicals generated by the electrolysis. More particularly, the electrode unit 140 can be structured as one of electrodes 140, 240, 340 shown in FIGS. 5 to 11.

Herein, as illustrated in FIG. 5, the apparatus 100 having an electrode unit 140 comprises a container unit 110 for receiving water and foodstuff, the electrode unit 140 fixed to the ground of the container 110 and an electric power supplier 160 supplying the electric power to the electrode unit 140. A negative power supply line 161 from the electric power supplier is connected to negative electrode plates 141 and a positive power supply line 162 is connected to positive electrode plates 142.

Figure 6:
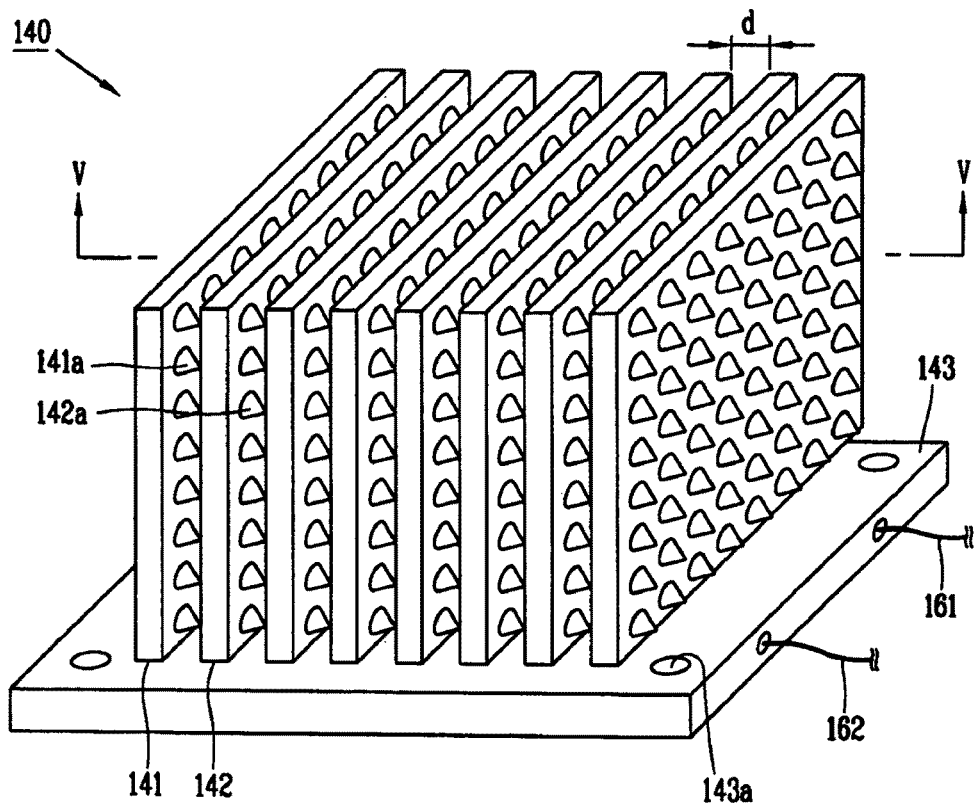
FIG. 6 is a perspective view illustrating a structure of an electrode unit of FIG. 4.
Figure 7:
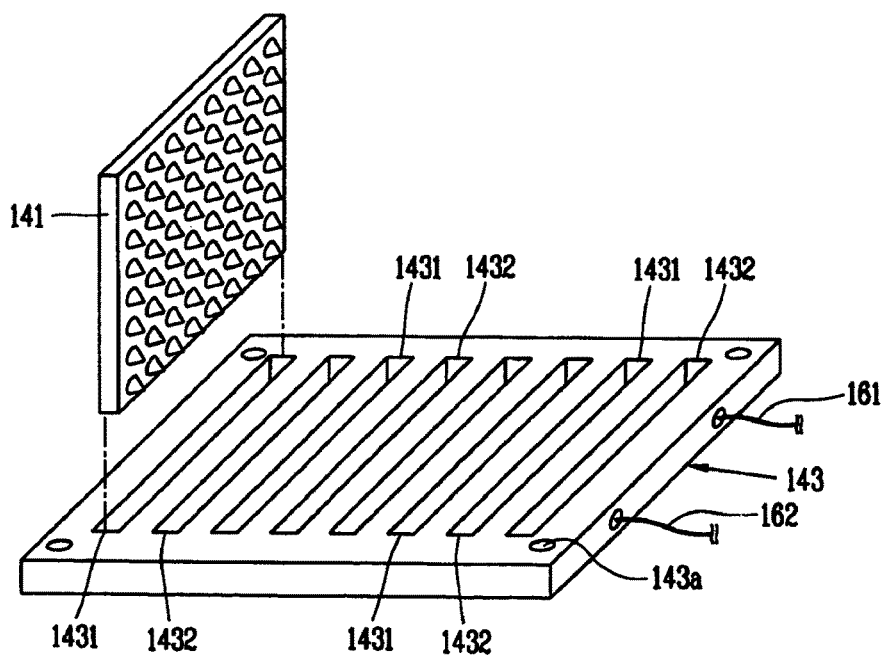
FIG. 7 is a separated perspective view of FIG. 6.
Figure 8:
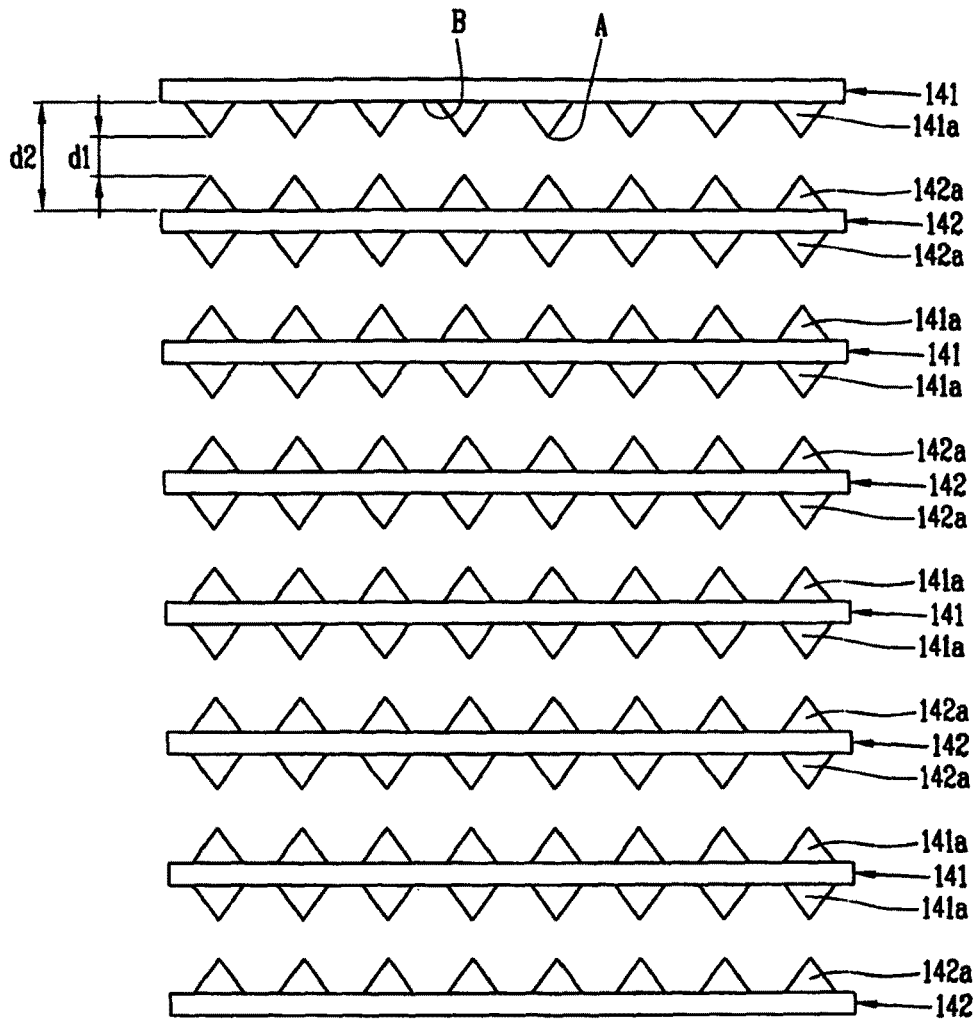
FIG. 8 is a cross sectional view by cut line V-V in FIG. 7.
Figure 9:
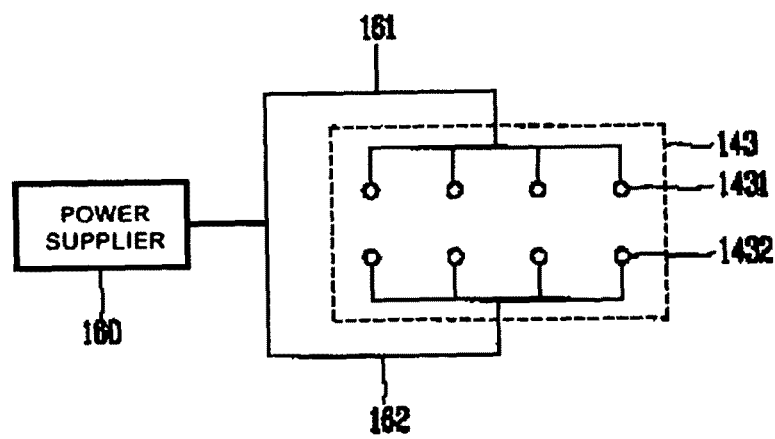
FIG. 9 is a wiring diagram illustrating power supply to an electrode of FIG. 4.

As shown in FIGS. 6 to 8, the electrode unit 140 includes negative electrode plates 141 having a plurality of negative projections 141a on its surface, positive plates 142 having plurality of positive projections 142a and a support 143 fixed to the ground of the container unit 110 fixing the negative electrode plates 141 and the positive electrode plates 142.

Herein, the negative electrode plates 141 and the positive electrode plates 142 are fixed to the support 142 at a distance d2 and have negative electrode projections 141a and positive electrode projections 142a projected and formed like a cone on sides B which face each other at a distance d1 whereby electric charges sent to the electrode plates 141, 142 converge on a fore-end B of projections 141a, 142a. Therefore, with the same amount of electric power, the negative electrode projections and the positive electrode projection make electrolysis of the water between them more acute.

Also, the negative electrode projections 141a and the positive electrode projections 142a are plated with more platinum than other parts so that the electrolysis can be more activated.

As illustrated in FIG. 7, the support 143 includes concave connection slots 1431 for fixing the negative electrode plates 141 and concave connection slots 1432 for fixing the positive electrode plates 142. As shown in FIG. 7, a negative power supply line 161 is connected to the connection slot 1431 of the negative electrode plates 141, and the positive power supply line 162 is connected to the connection slot of the positive electrode plates 142 inside of the support 143 so that simply inserting the support 143 into the slots 1431, 1432 can provide an environment of supplying electric power to the electrode plates 141, 142. The negative power supply line 161 is connected from the power supplier 160 to the negative electrode plate 141, and the positive power supply line 162 is connected from the power supplier 160 to the positive electrode plate 142.

When the platinum of the electrode plates 141, 142 is used up, the electrode plates 141, 142 can be separated and new electrode plates 141, 142 are replaced and inserted into the respective slots 1431, 1432. Therefore, comprised as above, the apparatus 100 for storing foodstuff can be permanently used.

Hereinafter, the operation principle of the apparatus 100 will be described.

When a user wishes to disinfect and sterilize water so that bacilli, bacteria, fungi and so on cannot get in contact with the foodstuff, the user pours tap water into a container unit 110 and supplies electric power from the electric power supplier 160 to the support 143. Then, the electric power is supplied to a connection slots 1431 of negative electrode plates 141 and slots 1432 of a positive electrode plates 142. Then, negative electric power is supplied to the negative electrode plates 141 and positive electric power is supplied to the positive electrode plates 142 through each connection slots 1431, 1432. Here, electric power is sent to the negative electrode plates 141 and the positive electrode plates 142 respectively, and the electric charges converge on the negative electrode projections 141a and the positive electrode projections 142a facing each other in each electrode plates 141, 142. Therefore, the electrolysis between projections 131a, 132a actively generates oxidants like ozone, H2O2, HOCl, OH radicals so that it disinfects and sterilizes residues, bacilli, viruses and bacteria in water contained in the container unit 110 in a short time.

The apparatus 100 needs only simple structure of the electrode plates 141, 142 having projections 141a, 142a inside of the container so that the container unit 110 can be sized as relatively bigger one.

Figure 4:
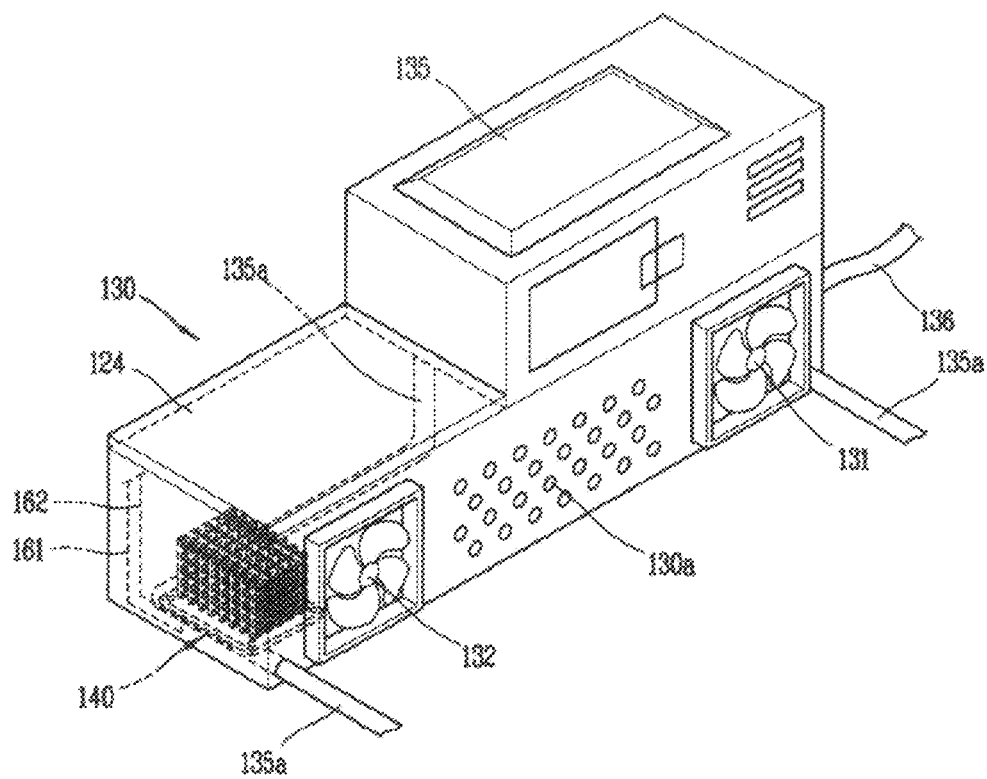
FIG. 4 is a perspective view of FIG. 2 illustrating the electrode unit and therearound.
Figure 10:
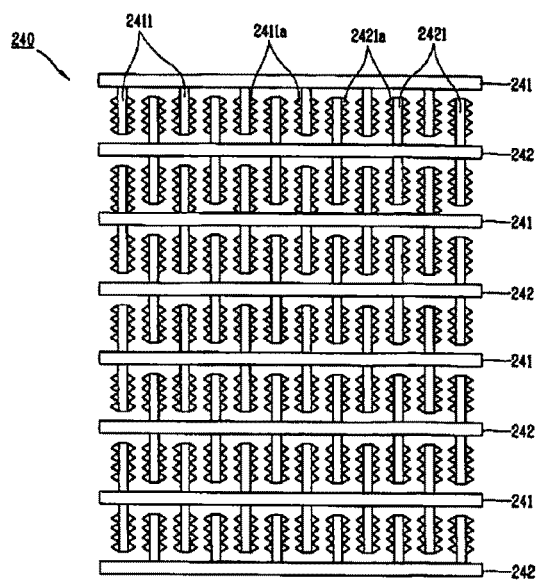
FIG. 10 is a cross sectional view of other type of the electrode structure by cut line V-V in FIG. 7.

On the other hand, as shown in FIG. 10 as another shape of the sectional view of FIG. 4, electrode plates 241, 242 can include branch plates 2411, 2421 from electrode plates 241, 242, and further, the negative projections 2411a and the positive projections 2421a can be formed in the branch plates 2411, 2421 facing each other at a near distance than the electrode plates 241, 242.

The structure as above has an advantage of manufacturing sterilized water used for an apparatus for storing foodstuff being disinfected and sterilized for a short time based on the principle that the more area for electrolysis can be realized.

Figure 11:
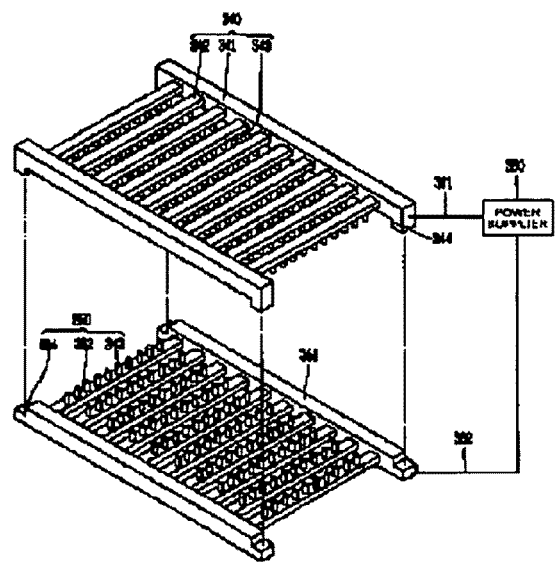
FIG. 11 is a cross sectional view of another type of the electrode structure by cut line V-V in FIG. 7

FIG. 11 is a sectional view illustrating another structure of the electrode unit in FIG. 4. Compared with the electrode unit 140 in FIG. 6, the electrode unit 340 in FIG. 11 has a features in that it comprises a negative electrode unit 340 supplied negative electric power through a negative electric power line 361 from an power supplier 360 and a positive electrode unit 350 supplied positive electric power through a positive electric power line 362 from the power supplier 360.

The negative electrode unit 340 includes two support rods 341 of negative electrode posed at a distance and connected to a negative power line 361, a negative electrode rod 341 which forms a plurality of rods between the support rod 341 of negative electrode, the negative projections 433 projected like a pillar on the low side of the negative electrode rod 341 to gather electric charges and a fitting projections 344 formed in the low side of the negative electrode support rod 341 to ensure a predetermined distance from the positive electrode 350.

The positive electrode unit 350 comprises two support rods 351 of positive electrode posed at a distance and connected to a positive power line 362, a positive electrode rod 442 which forms a plurality of rods between the support rod 441 of positive electrode 351, a positive projection 353 projected like a pillar on the upper side of the positive electrode rod 351 to gather electric charges and a fitting groove 354 formed in the upper side of the positive electrode support rod 351 to ensure a predetermined distance from the negative electrode 340.

Here, in order to prevent the electric current from flowing between the negative electrode 340 and the positive electrode 350, an insulator having a specific thickness is inserted between the fitting projections 344 and fitting groove 354 or coated for insulation. Also, in the condition of fitting the projections 344 to the groove 354, the fore-end of the negative electrode projections 343 keep a distances from the fore-end of the positive electrode projections 353 so that the vigorous electrolysis is inducted between them.

As the electrode projections 343, 353 are formed as rod shaped on the support rods 342, 352, The electrode unit 340, 350 comprised above of the apparatus for storing foodstuff reduces the loss of the electric power and has an advantage of easily manufacturing.

Figure 12:
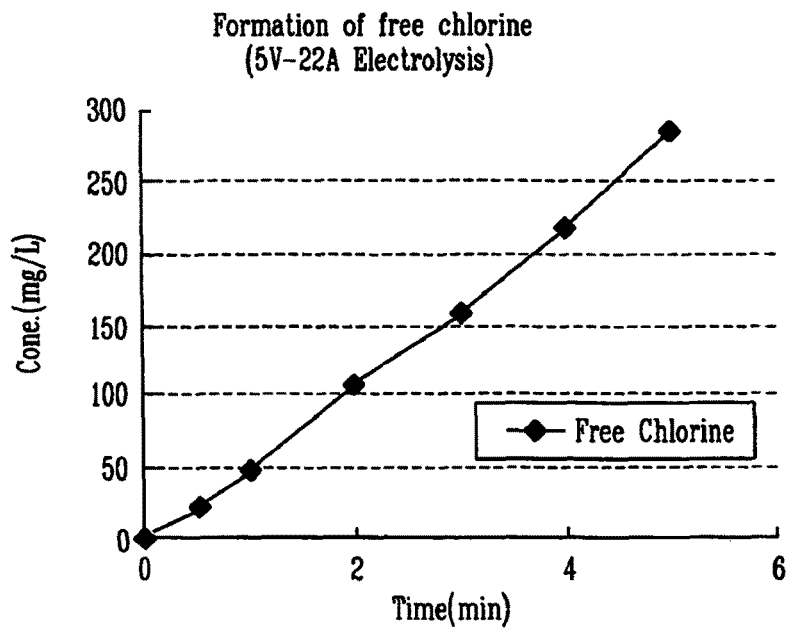
FIG. 12 is an experiment data graph illustrating measurement of chlorine ion increase in accordance with electrolysis of saline water.
Figure 13:
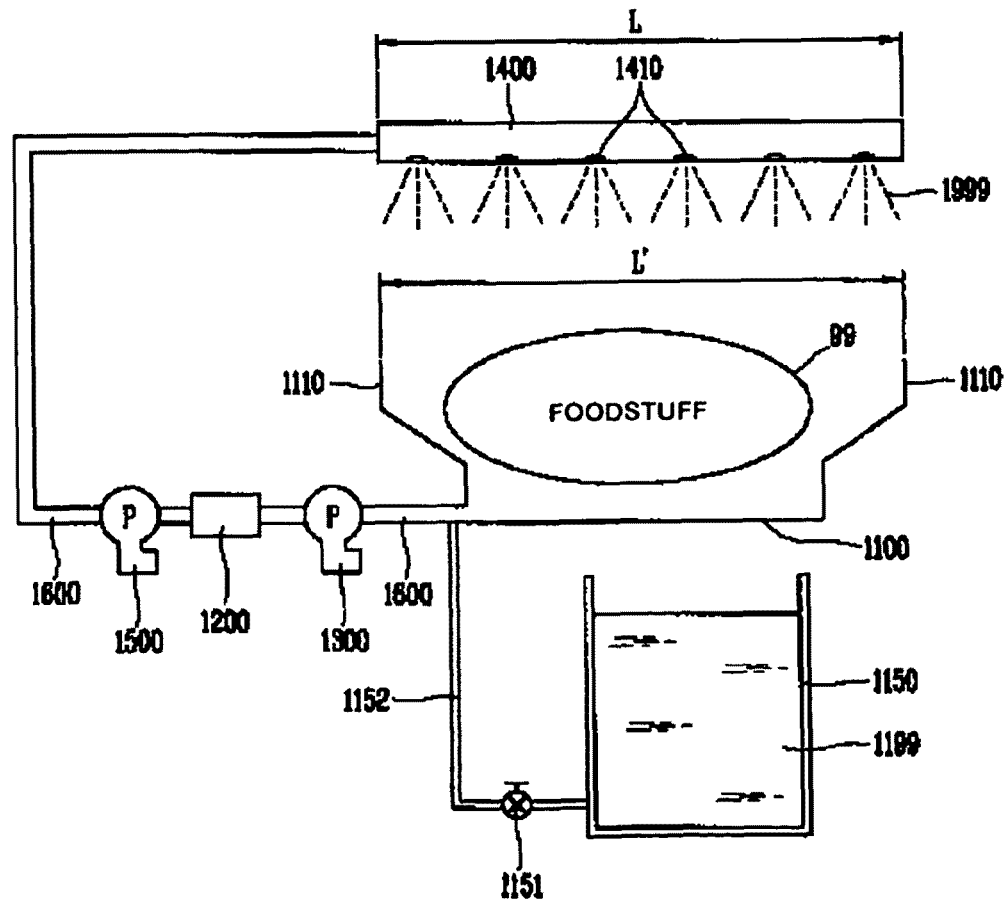
FIG. 13 is a schematic view illustrating an apparatus for storing foodstuff of another embodiment in accordance with the present invention.

FIG. 12 is an experiment data graph illustrating the increase of saline ion according to electrolysis by sending electric power of 5V, 2.2 A to the saline water having salinity 0.98% and ph 6.39. As shown in the experiment of FIG. 12, electrolysis is more vigorous in the saline water so that the quick sterilizing effect can be achieved. Furthermore, projections 141a, 142a to converge more electric charges are formed in electrode plates 141, 142 whereby more vigorous electrolysis than the experiment in FIG. 7 will be realized and the sterilizing time will be much more shorten. Therefore, the water used for the present invention can include saline water as well as tap water, distilled water.

Accordingly, if foodstuff is to be stored with 0.9% saline solution in the temperature range which might not cause cold shortening before the rigidity is completed after butchery, especially if meat or mutton is to be stored with maintaining at about 18° C. by the apparatus of one embodiment in accordance with the present invention, as it is possible to continuously maintain the foodstuff in aseptic condition without losing its moisture, the apparatus 100 enables to sanitarily store foodstuff with lower cost.

MODE FOR THE INVENTION

On the other hand, the technical idea of the preferred embodiment can be extended to the other embodiment which can store a large amount of foodstuff 1000. In other words, the apparatus for storing foodstuff is a container 1100 for accommodating foodstuff, a water tank 1150 accommodating water so as to manufacture sterilized water, water sterilizer 1200 for manufacturing sterilized water, a first pump 1300 for supplying sterilized water in a container 1100 to the water sterilizer 1200 when necessary, a spreader 1400 of spraying the sterilized water from sterilizer 1200 to foodstuff 99, a second pump 1500 for transporting the sterilized water in the sterilizer 1200 to the spreader 1400, main conduit 1600 connecting from the container 1100 to the spreader 1400.

The container 1100 is formed as longer size L comparing with the length L of the spreader 1400, and thus, recycling of the used sterilized water can be realized.

The water tank 1500 is, when the apparatus 1000 is used on movable truck, designed as having size enough to receive the used sterilized water. However, in case that the apparatus 1000 is used in a building, and that it is not relatively less necessary because water can be supplied by a water pipe. In order to control the amount of the supplied water, a valve 1151 is installed on the connection conduit 1152 between the main conduit 1600 and the water tank 1150.

Figure 14:
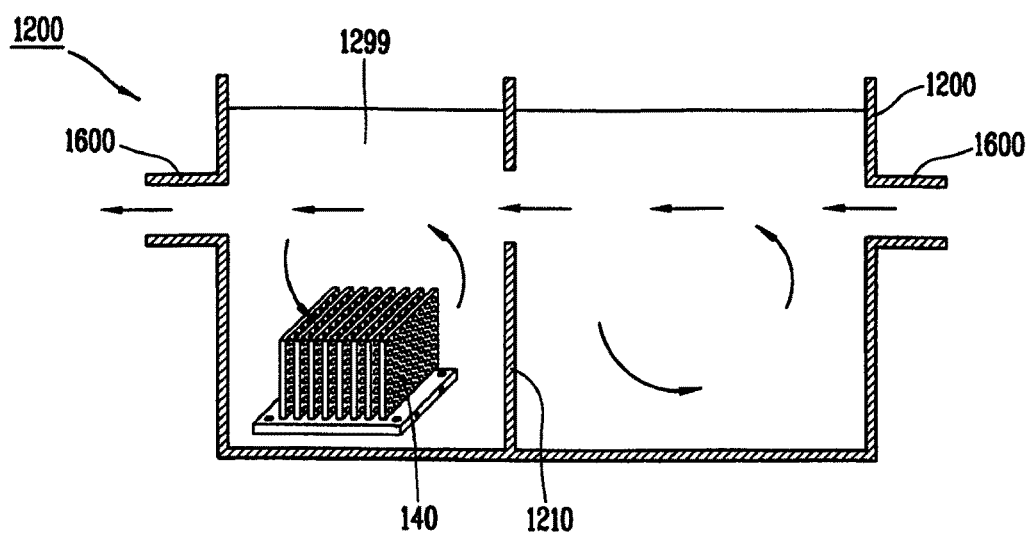
FIG. 14 is a cross sectional view of sterilized water generator in FIG. 13

As shown in FIG. 14, by supplying electric power to the electrode unit 140 the, sterilizer 1200 electrolyzes water supplied from the water tank 1150 as a new water or from the container 1110 as a used sterilized water, thereby manufacturing sterilized water. Herein, in order to effectively manufacture the sterilized water, a partition 1210 is formed in the sterilizer 1200. Also, as described above, the electrode unit 140 can be replaced by differently constructed electrode unit 240, 340, 350.

The spreader 1400 has many spraying holes 1999, and thus can spread the sterilized water into the foodstuff by dropping, spraying or so. Accordingly, the spreader 1400 is formed to arrange a plurality of spreading lines.

Similarly to the one embodiment, a temperature sensor can be installed in the sterilizer 1200, and refrigerator or heat line can be installed in order to control the foodstuffs temperature at which each of diverse foodstuffs can be maintained within its appropriate temperature range. Also, although the sterilized water can be continuously spread to the foodstuff, it is more effective to intermittently spread the sterilized water for foodstuff which is not likely to be spoiled.

Industrial Applicability

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims. That is, exemplary embodiment of the present invention includes electrode projections shaped like a pillar in order to converge electric charges, but the shape is not limited to the pillar shape but should include any shape which can inducts the concentration of electric charges.

It is also clear that the shape of electrode unit is not limited to exemplary embodiment of the present invention, but should include any shape of electrode for inducting electrolysis.

The invention claimed is:

1. An apparatus for storing foodstuff comprising:
   a container for accommodating foodstuff;
   at least one electrode unit having a negative electrode and a positive electrode, said positive electrode being spaced-apart from the negative electrode, the negative electrode having a plurality of negative electrode projections thereon and the positive electrode having a plurality of positive electrode projections thereon, the plurality of positive electrode projections on said positive electrode being aligned to face each other one by one with the plurality of negative electrode projections on said negative electrode so as to make sterilized water to be supplied to the foodstuff by electrolyzing water;
   a power supplier connected to said electrode unit for supplying DC electric power to the electrode unit;
   a supplying means for supplying the sterilized water to the foodstuff; and
   a control means for maintaining the temperature of the foodstuff in a predetermined temperature range.

2. The apparatus as claimed in claim 1, wherein the foodstuff is meat.

3. The apparatus as claimed in claim 2, wherein the predetermined temperature range is set to include at least one temperature between 10° C. and 25° C.

4. The apparatus as claimed in claim 2, wherein the control means controls the temperature of the foodstuff to reach 18° C. within the predetermined temperature range.

5. The apparatus as claimed in claim 2, wherein the electrode unit is installed in an electrode chamber which is separated from the foodstuff accommodated in the container by at least one partition.

6. The apparatus as claimed in claim 5, further comprising:
   a circulation fan for circulating water in the electrode chamber into the container.

7. The apparatus as claimed in claim 2, wherein the supplying means is formed so that the foodstuff is immersed in the sterilized water.

8. The apparatus as claimed in claim 2, wherein the supplying means is formed so that the sterilized water is spread to the foodstuff.

9. The apparatus as claimed in claim 2, further comprising a temperature sensor in the container for sensing the temperature of the foodstuff.

10. The apparatus as claimed in claim 2, wherein the supplying means periodically supplies the sterilized water to the foodstuff.

11. The apparatus as claimed in claim 2, wherein the control means includes a circulation conduit in the container for conveying a cooling fluid therethrough so as to lower the temperature of foodstuff.

12. The apparatus as claimed in claim 2, wherein the control means includes a heat line near the container for supplying heat to the foodstuff so as to raise the temperature of the foodstuff.

13. The apparatus as claimed in claim 2, wherein the water is at least one of distilled water, tap water, underground water and purified water.

14. The apparatus as claimed in claim 2, wherein the water is salt solution.

* * * * *